US008296372B2

(12) United States Patent
Flach

(10) Patent No.: US 8,296,372 B2
(45) Date of Patent: Oct. 23, 2012

(54) METHOD AND SYSTEM FOR MERGING ELECTRONIC MESSAGES

(75) Inventor: Andreas M. Flach, Reilingen (DE)

(73) Assignee: SAP AG, Walldorf (DE)

( * ) Notice: Subject to any disclaimer, the term of this patent is extended or adjusted under 35 U.S.C. 154(b) by 521 days.

(21) Appl. No.: 11/617,722

(22) Filed: Dec. 29, 2006

(65) Prior Publication Data

US 2008/0162643 A1    Jul. 3, 2008

(51) Int. Cl.
G06F 15/16 (2006.01)
G06F 15/173 (2006.01)
G06F 15/177 (2006.01)
(52) U.S. Cl. .................. 709/206; 709/204; 709/207
(58) Field of Classification Search .......... 709/206, 709/204, 207
See application file for complete search history.

(56) References Cited

U.S. PATENT DOCUMENTS

| 2002/0087646 A1* | 7/2002 | Hickey et al. | 709/206 |
| 2003/0110227 A1* | 6/2003 | O'Hagan | 709/206 |
| 2004/0044735 A1* | 3/2004 | Hoblit | 709/206 |
| 2004/0073616 A1* | 4/2004 | Fellenstein et al. | 709/206 |
| 2004/0260756 A1* | 12/2004 | Forstall et al. | 709/200 |
| 2005/0027779 A1* | 2/2005 | Schinner | 709/200 |
| 2005/0031096 A1* | 2/2005 | Postrel | 379/88.22 |
| 2007/0271345 A1* | 11/2007 | Callanan et al. | 709/206 |
| 2007/0282956 A1* | 12/2007 | Staats | 709/206 |

* cited by examiner

Primary Examiner — Haresh N Patel
Assistant Examiner — Chau Le

(57) ABSTRACT

What is described is a method and system for merging electronic messages. The method includes receiving a message at a client, determining if the message relates to a stored message, merging the message in the stored message to generate a merged message if the message relates to the stored message, and transmitting the merged message to a destination.

16 Claims, 10 Drawing Sheets

METHOD AND SYSTEM FOR MERGING ELECTRONIC MESSAGES

FIELD OF THE INVENTION

The invention relates to transmission of electronic messages. More particularly, the invention relates to a system and method to merge electronic messages.

DESCRIPTION OF THE RELATED ART

Electronic mail clients enable a user to exchange electronic messages with other users through electronic mail (email) servers. These email clients display to a user a list of messages that the user has received. If the user wants to view the full message, the user selects the message from the displayed list and the email client renders the selected message on a display device. The user repeats this process for every message that the user wants to view.

Many email clients enable a user to sort and group messages by various message attributes, including the subject line. Thus, users can group related messages and replies in the displayed list, but the user may still have to view each message individually.

If a user wants to respond to a message, the user simply selects the message from the displayed list, and activates a reply command. In general, an email client responds to a reply command by creating a new message with same subject line. Many email clients also copy the content of the original message into the reply message.

A typical email client's response to a reply command, which generally includes copying the original message content into the reply message, may be useful and convenient for users exchanging a limited number of messages. As the number of messages and replies increases, duplicate content may increase burden on the user to process and manage the information in the messages. This may also increase the burden on the underlying data storage system as well. The burden increases proportionally with each additional user that participates in the message exchange. For example, if a user sends a message to a group of participants for their feedback. If each recipient of the message sends a reply back to the user, the user will have to sort all the replies and group them. In addition, if the user wants to view the messages, the user selects each message from the grouped messages.

Although grouping related messages may relieve some of the burden by allowing the user to group related messages in the displayed list of messages, but the user continues to face the burden of opening and reading multiple messages. Furthermore, the burden on the underlying data storage system still exists.

In addition, a steady stream of messages may distract the user from other productive work. Likewise, searching through a set of messages on a topic to find a particular comment or discussion may become time-consuming and frustrating. Moreover, increase in number of stored messages may increase complexity of search through the messages; the more messages to search, the slower the search.

SUMMARY OF THE INVENTION

What is described is a method and system for merging electronic messages. The method includes receiving a message at a client, determining if the message relates to a stored message, merging the message in the stored message to generate a merged message if the message relates to the stored message, and transmitting the merged message to a destination.

BRIEF DESCRIPTION OF THE DRAWINGS

The embodiments of the invention, together with its advantages, may be best understood from the following detailed description taken in conjunction with the accompanying figures in which.

DETAILED DESCRIPTION

Figure 1:
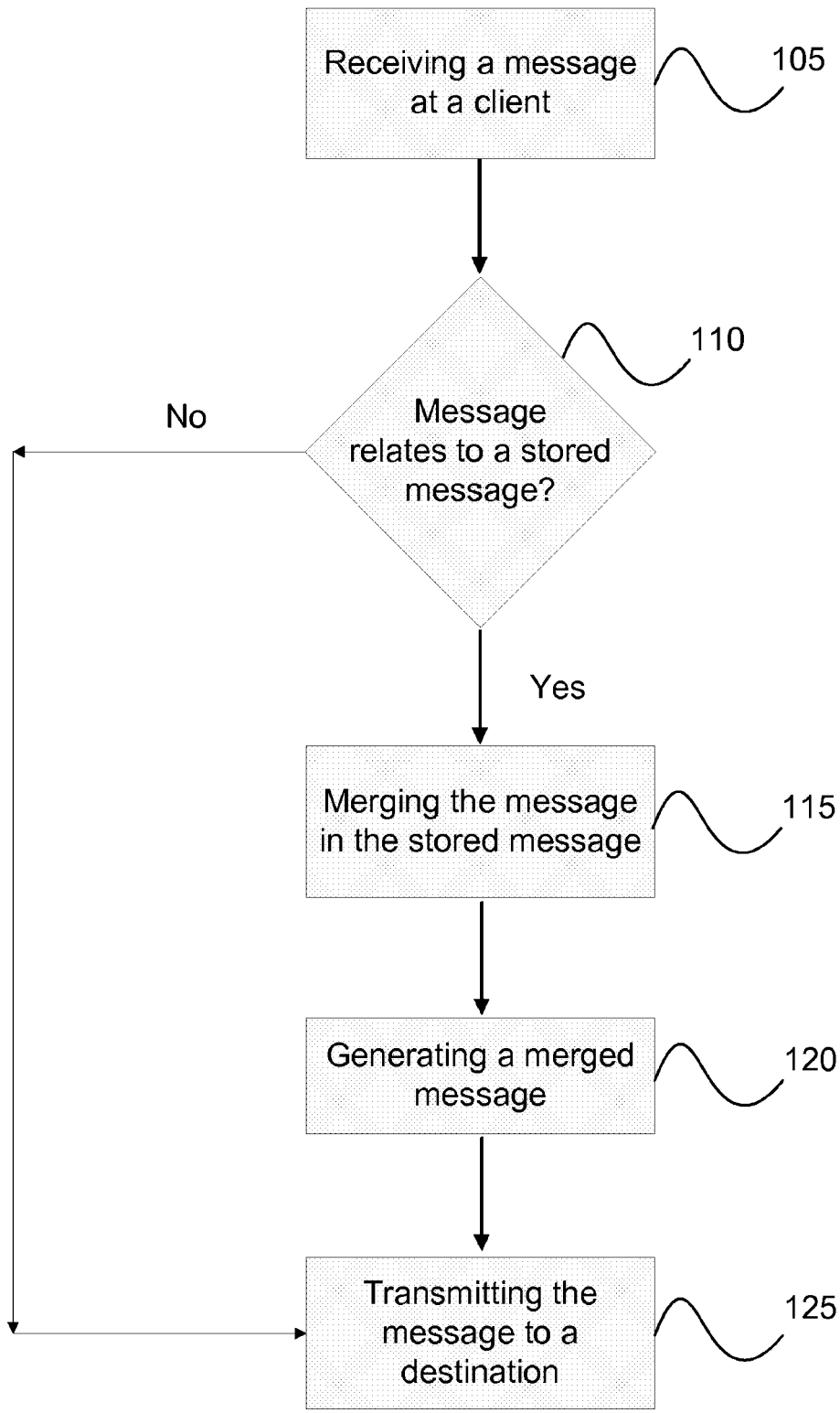
FIG. 1 illustrates a method for merging electronic messages according to an embodiment of the invention.

Embodiments of the invention are generally directed to a method and a system for merging electronic messages. An embodiment of the invention describing the method is shown in FIG. 1. The method includes receiving a message at a client 105. At 110, a determination is made if the message relates to a stored message. If so, then at 115, the message is merged with the stored message to generate a merged message at 120. At 125, the merged message is transmitted to a destination.

The determination includes comparing the message and the stored message on a common attribute. The common attribute may include at least one of a unique message identifier, and a subject attribute. Those skilled in the art may appreciate that a customizable attribute that include an attribute which may be used to identify related messages may also be used as a common attribute.

The client and the destination includes, but not limited to at least one of an electronic mail (email) server, a backup email server, a mail transfer agent, an email hosting service, and an email client. The email client may be resident on a user device. The user device includes heterogeneous computing devices with different processing power, usability and portability. The client and the destination may also include an application server having the stored message and an application. The stored message may be accessed from the memory and the application compares the message against the stored message at the client to retrieve a dynamic content of the message.

The memory may include a persistent storage having the stored message. In addition, the memory may also include database or other data storing medium having the stored message therein. Such databases or storing medium are based on different data models such as flat model, hierarchical model, network model, relational model, dimensional model, and object database model.

Figure 2:
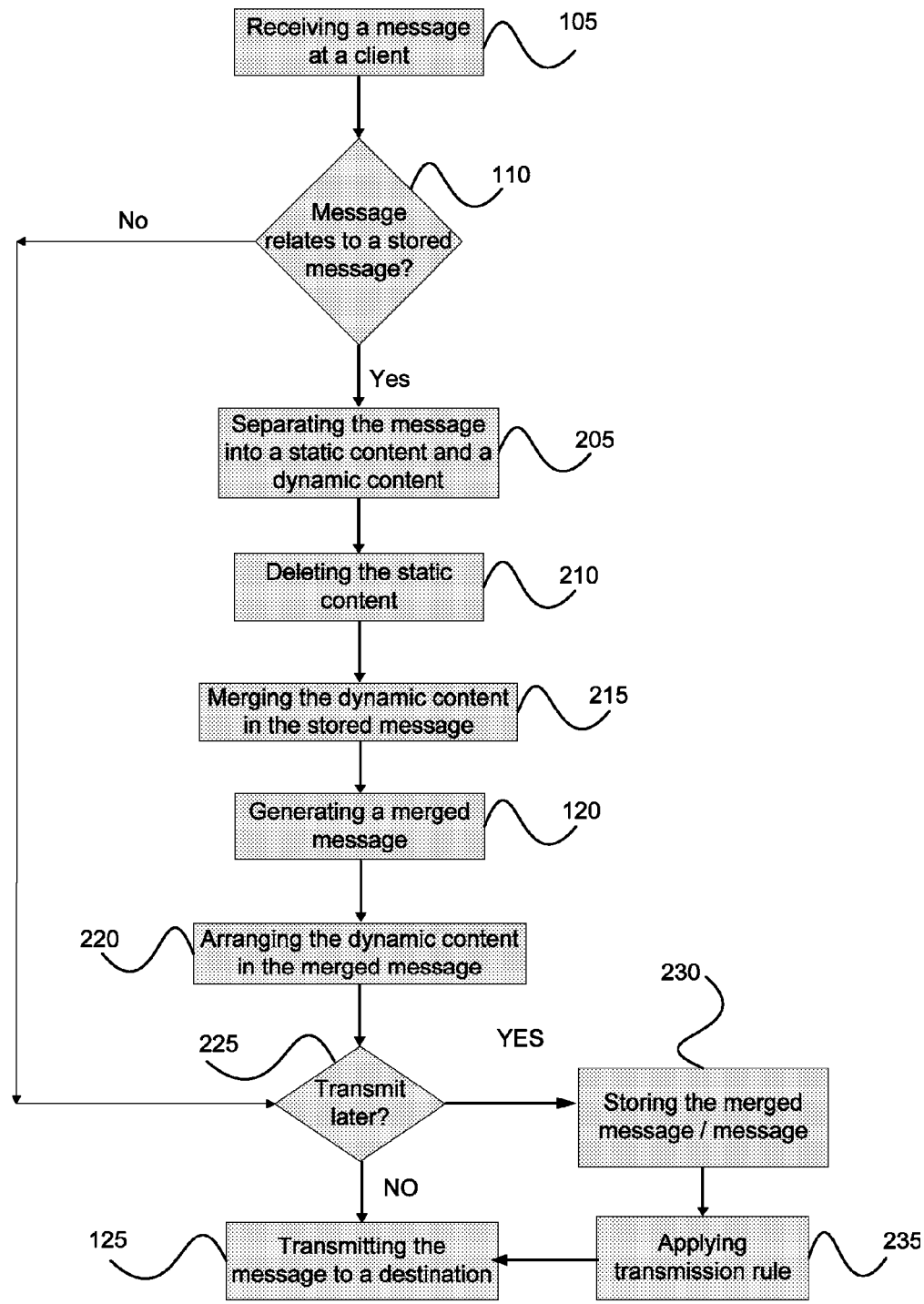
FIG. 2 illustrates a method for merging electronic messages according to an embodiment of the invention.

FIG. 2 illustrates additional details of one embodiment of the invention. At 110, a determination is made if the message relates to a stored message. If not, then a further determination is made at 225 if the message is to be transmitted when the message is received at the client or later. If the message is to be transmitted later, the message is stored in a memory at 230 and based upon a transmission rule at 235, the message is transmitted to a destination at 125.

Merging is described in 205, 210 and 215. At 205, the message is separated into a static content and a dynamic content. The static content is common with the stored message and the dynamic content is not common with the stored message. The common content may include message content, which is identical with content of the stored message as well as the message content that is sufficiently similar to the content of the stored message. While a comparison indicates that content of the message and content of the stored message are not identical, but if a threshold is met or exceeded that indicates the data is sufficiently similar to be considered common. The threshold may be decided by a separator based on a separating algorithm. The merging further includes deleting the static content at 210 and merging the dynamic content with the stored message at 215. At 120, a merged message is generated.

At 220, the dynamic content is arranged in the merged message by a common property as set in a content arrangement rule. The common property may include a sender property, and a date property. Those skilled in the art may appreciate that a similar extensible property such as message size property may also be used as a common property. At 125, the merged message with arranged dynamic content is transmitted to a destination.

In another embodiment, at 225, a determination is made if the merged message is to be transmitted when the merged message with arranged dynamic content is generated or later. If the merged message is to be transmitted later, then at 230 the merged message may be stored in a memory as a stored merged message. Based on a transmission rule that is applied on the stored merged message, the stored merged message is then transmitted to a destination at 125.

The transmission rule may include a rule for storing the merged message in the memory and transmitting the stored merged message from the memory to the destination. The transmission rule includes but not limited to a time based rule, and number of responses based rule. For example, if a user sends an original message to a group of participants for their feedback, a transmission rule may be set to transmit the stored merged message for the original message, when eighty percent of the participants have replied to the initial message. Similarly, time based rule may be set setting a transmission rule for transmitting the stored merged message to the destination on completion of five days from the date of sending the initial message.

Those of skill in the art will recognize that a different transmission rule may also be set. In addition, although the application describes a message, however such message may include workflow and many such variants that are possible and fully within the scope and spirit of this disclosure.

An original message, replies for the message, and a merged message according to an embodiment of the invention are illustrated in FIG. 3 through FIG. 7.

Figure 3:
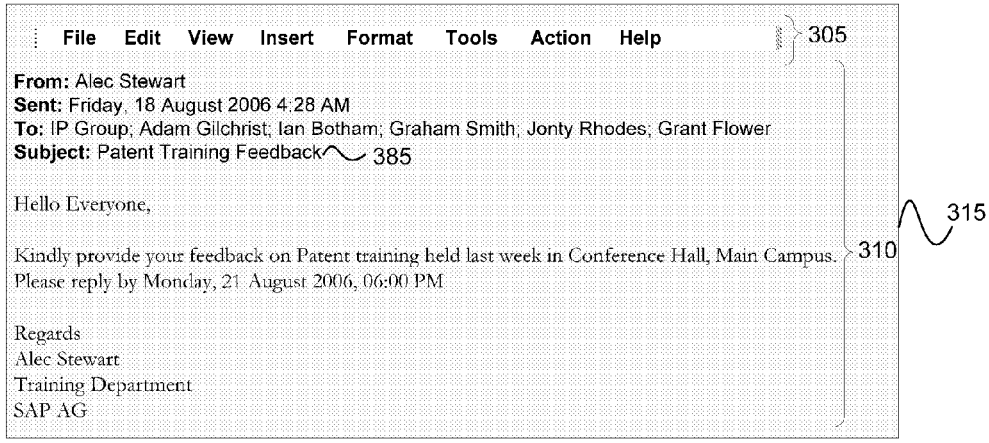
FIG. 3 illustrates an original message and a first message received as a reply for the original message according to an embodiment of the invention.
Figure 3:

FIG. 3 illustrates an original message and a first message received as a reply for the original message according to an embodiment of the invention.

315 shows a menu 305 and an original message 310 with a subject attribute 385. A user sends the original message to a group of recipients included in the "To" list. The group of recipients includes individuals and an email group "IP Group", which has members subscribed to the group. The original message is also stored in a memory as a first stored message.

325 shows a message received at a client. The message includes a first message 320 with a subject attribute 390 received from one of the participants as a reply to the original message 310.

The message 325 is compared with the first stored message 315 to determine if the message relates to the stored message based on a common attribute. In this scenario, the common attribute is subject attribute. The subject attribute 385 of the first stored message is compared with the subject attribute 390 of the message. After the determination, the message is separated into a static content and a dynamic content, wherein the static content is common with the first stored message and the dynamic content is not common with the first stored message.

Figure 4:
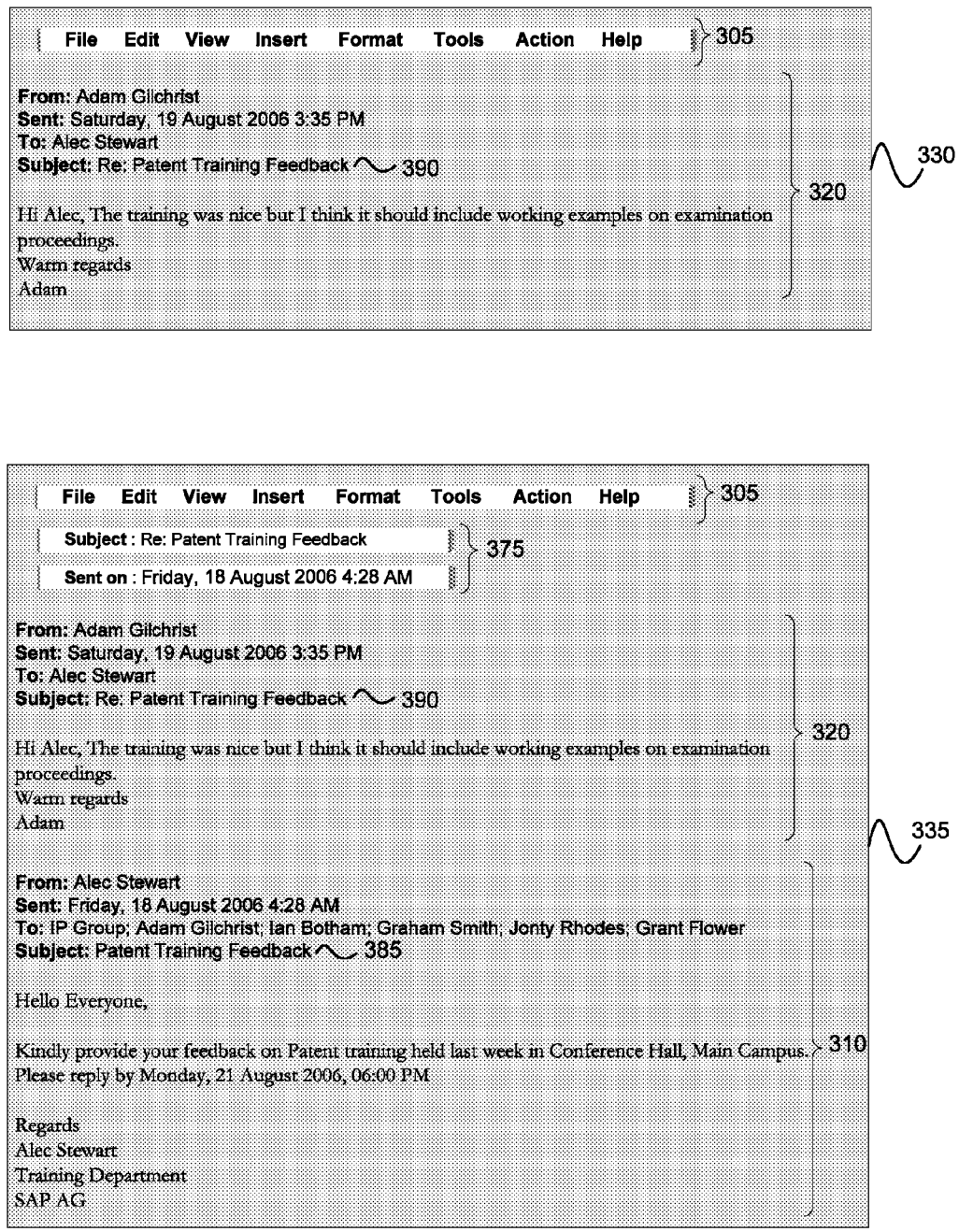
FIG. 4 illustrates a dynamic content of the first message and a merged message based on the first message according to an embodiment of the invention.

FIG. 4 illustrates a dynamic content of the first message and a merged message based on the first message according to an embodiment of the invention.

Based on comparison of the message (refer FIG. 3, 325) with the first stored message (refer FIG. 3, 315), the dynamic content 330 is separated out. The dynamic content includes the menu 305 the dynamic content text 320. In addition, the static content (refer FIG. 3, 310) is deleted from the message. It may be observed that in this case, the dynamic content is same as the first message and the static content is same as the original message. It may be appreciated by a person skilled in the art that the dynamic content may exclude the menu 305.

The dynamic content 330 is then merged with the first stored message (refer FIG. 3, 315) to generate a merged message 335. The merged message includes the stored message 310 and the dynamic content 330. In addition, the merged message also includes the menu 305 and mail information 375, which includes the common attribute and date of original message. Those skilled in the art may customize information contained in the mail information. The merged message 335 is stored in the memory as a second stored message.

Figure 5:
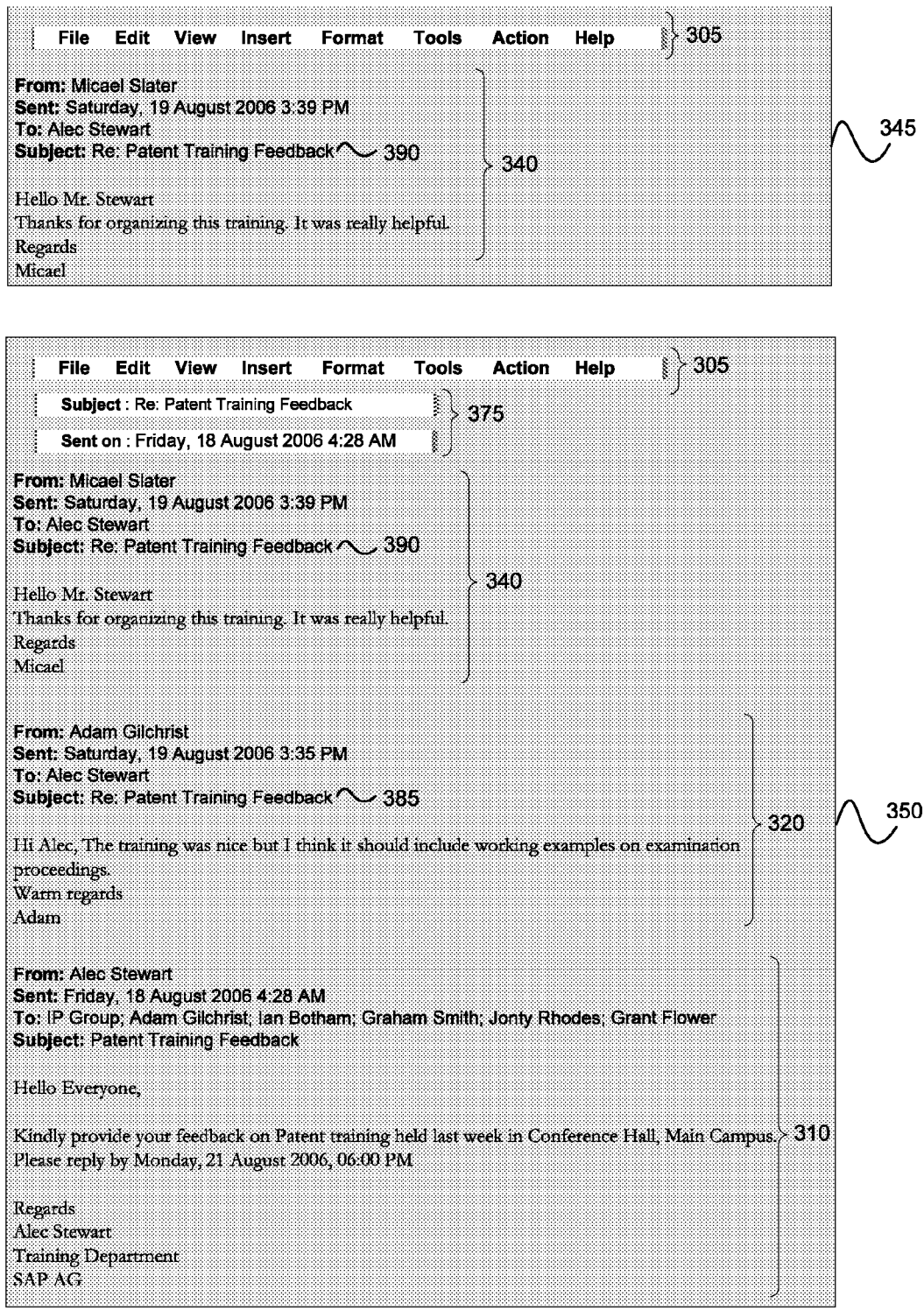
FIG. 5 illustrates a second message received as a reply for the original message and a merged message based on the second message according to an embodiment of the invention.

FIG. 5 illustrates a second message received as a reply for the original message and a merged message based on the second message according to an embodiment of the invention.

345 shows a message received at a client. The message includes a second message 340 with a subject attribute 390 received from a member of IP group as another reply to the original message 310. In present case, while replying the participant only includes the second message as the reply. The message 345 is compared with the second stored message 335 on a common attribute, that is, subject attribute to determine if the message 345 relates to the second stored message 335. The message is compared with the second stored message and static content and dynamic content of the message are separated. The dynamic content 345 in this case is same as the message received at the client and there is no static content. The dynamic content 345 is merged with the second stored content to generate a third merged message 350, which is stored as a third stored message.

Figure 6:
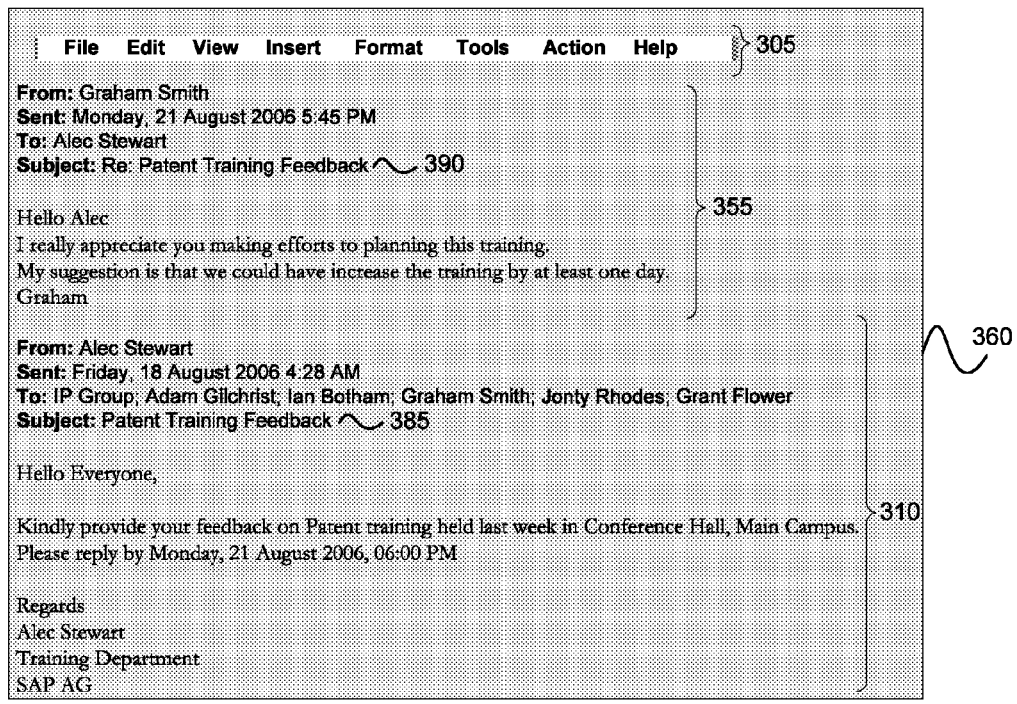
FIG. 6 illustrates a third message received as a reply for the original message and a dynamic content of the third message according to an embodiment of the invention.
Figure 6:
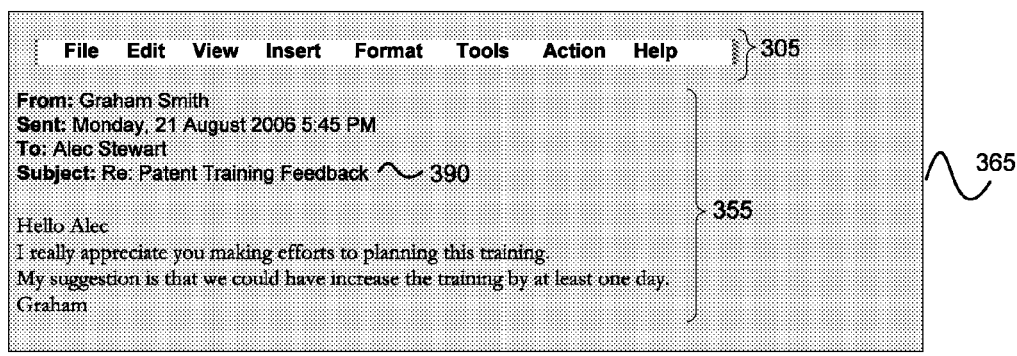

FIG. 6 illustrates a third message received as a reply for the original message and a dynamic content of the third message according to an embodiment of the invention.

360 shows a message received at a client. The message includes a third message 355 with a subject attribute 390 received from one of the participants in reply to the original message 310. The message 360 is compared with the third stored message 350 on a common attribute, that is, subject attribute to determine if the message 360 relates to the third stored message 350. The message is compared with the third stored message and static content and dynamic content of the message are separated. The static content 310 is deleted and the dynamic content 365 is merged with the third stored message to generate a merged message (refer FIG. 7, 370).

Figure 7:
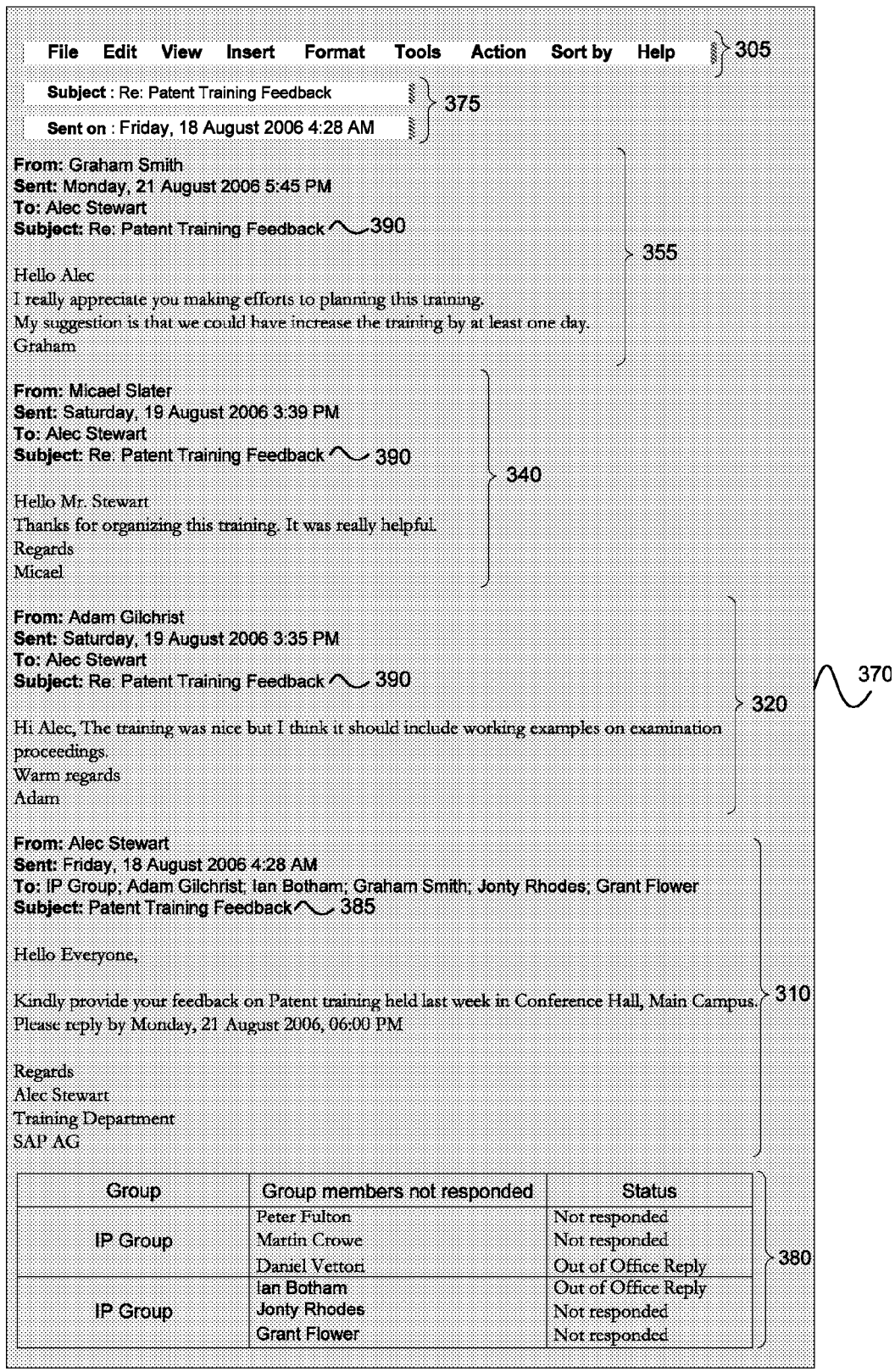
FIG. 7 illustrates a merged message according to an embodiment of the invention.

FIG. 7 illustrates a merged message 370 according to an embodiment of the invention. The merged message contains the original message 310, and dynamic contents of the replies received for the original message. The dynamic contents are represented by the first message 320, the second message 340, and the third message 355. The merged message further includes the menu 305, the common attribute, that is, subject attributes 385 and 390, mail information 335 and status 380. The status includes a list of participants and status of message received from the participants. Those skilled in the art may appreciate that other related information may also be included in the status or in the merged message.

Figure 8:
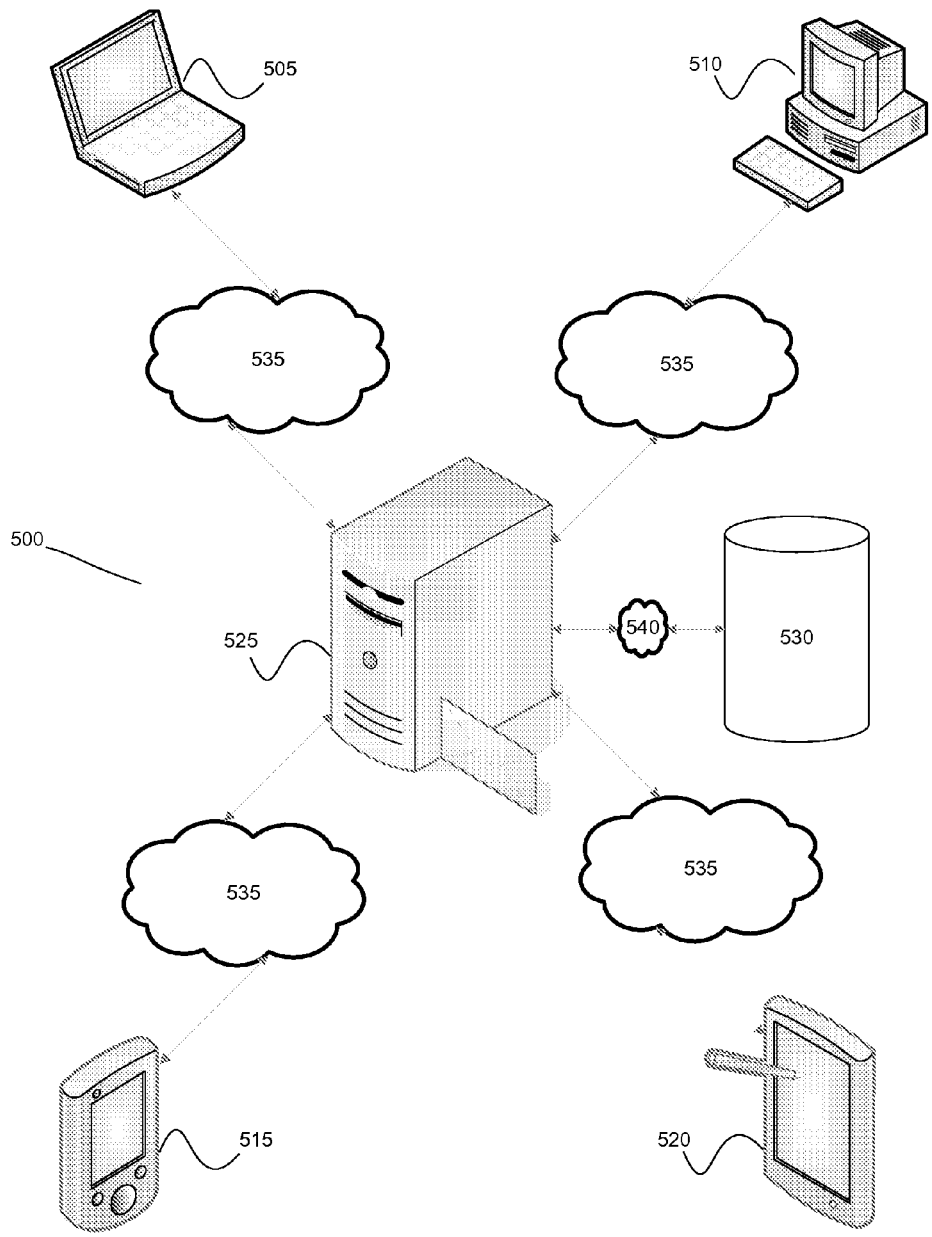
FIG. 8 illustrates an architecture diagram connecting hardware devices to create a network for transferring messages according to an embodiment of the invention.

FIG. 8 illustrates an architecture diagram connecting hardware devices to create a network for transferring messages. Computer network 500 comprises a client 525 coupled to heterogeneous computing devices 505, 510, 515 and 520 through a network connection 535. The client is also coupled to a memory 530 via network connection 540. Network connection 535 and 540 may include a simple local area network or may be a larger wide area network, such as the internet. While computer network 500 depicted in FIG. 8 is intended to represent a possible network architecture, it is not intended to represent an architectural limitation.

Figure 9:
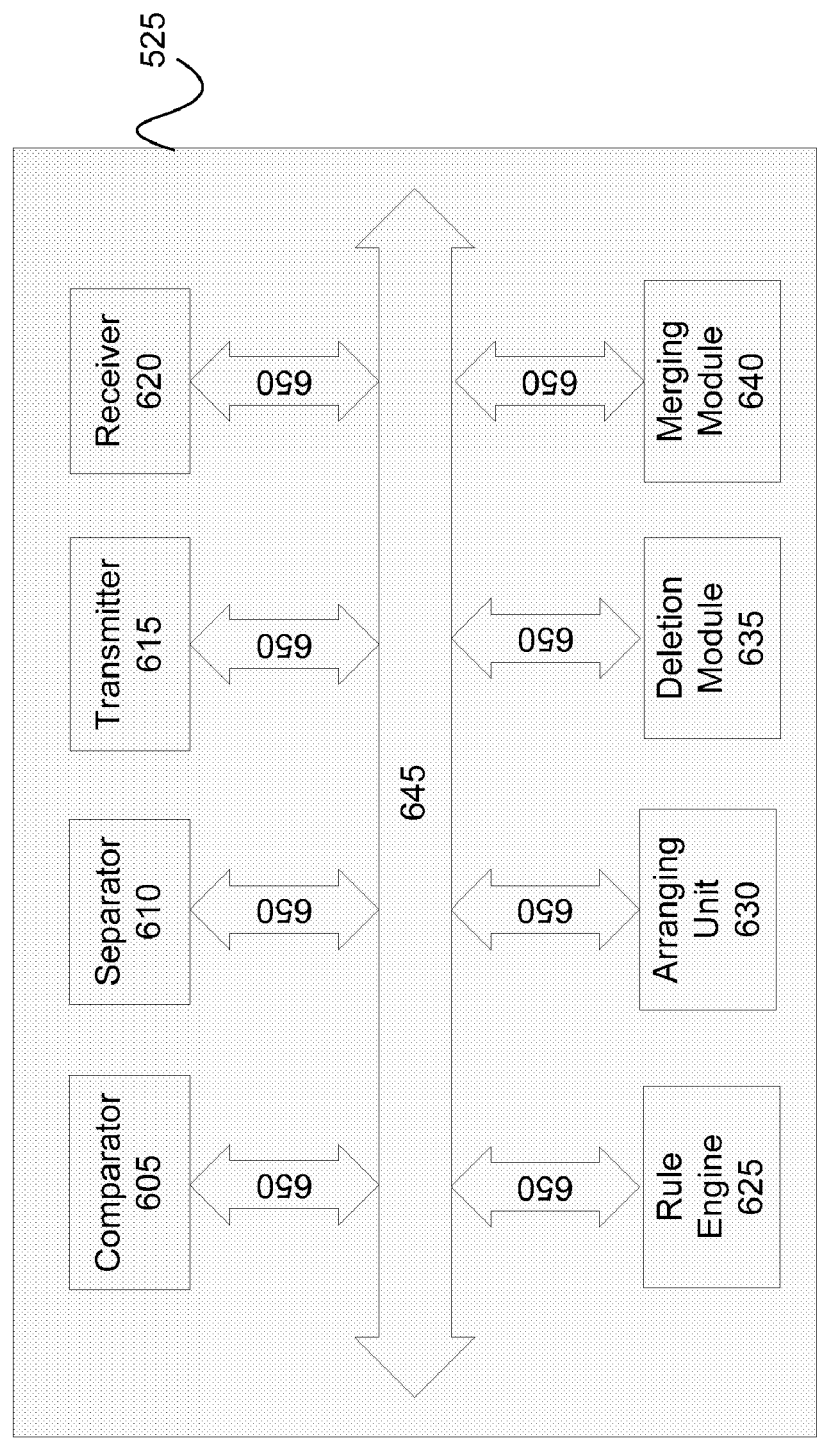
FIG. 9 illustrates an architecture of a client according to an embodiment of the invention.

FIG. 9 illustrates architecture of a client according to an embodiment of the invention. The client includes a receiver 620 to receive a message at the client. A processor that includes a comparator 605 and a merging module 640 to process the program code thorough the comparator and the merging unit. The comparator 605 to compare the message with the stored message on common attributes to determine if the message relates to a stored message, the merging module 640 to merge dynamic content of the message in the stored message to generate a merged message if the message relates to the stored message and a transmitter 615 to transmit the merged message to a destination.

The client further includes a separator 610 to separate the message into a static content and a dynamic content, wherein the static content is common with the stored message and the dynamic content is not common with the stored message. The separator is based upon a separating algorithm and if content of the message is exceeds a threshold that indicates the data is sufficiently similar to be considered common.

A deletion module 635 to delete the static content from the message. The client also includes a rule engine 625 to set a content arrangement rule, like a date based arrangement, and an alphabetical arrangement, to arrange dynamic content in the merged message. An arranging unit 630 arranges the content in the merged message based upon the content arrangement rule. The rule engine 625 further sets a transmission rule for transmitting the merged message to the destination. The client components may communicate among each other through communication channels 645 and 650 respectively.

Figure 10:
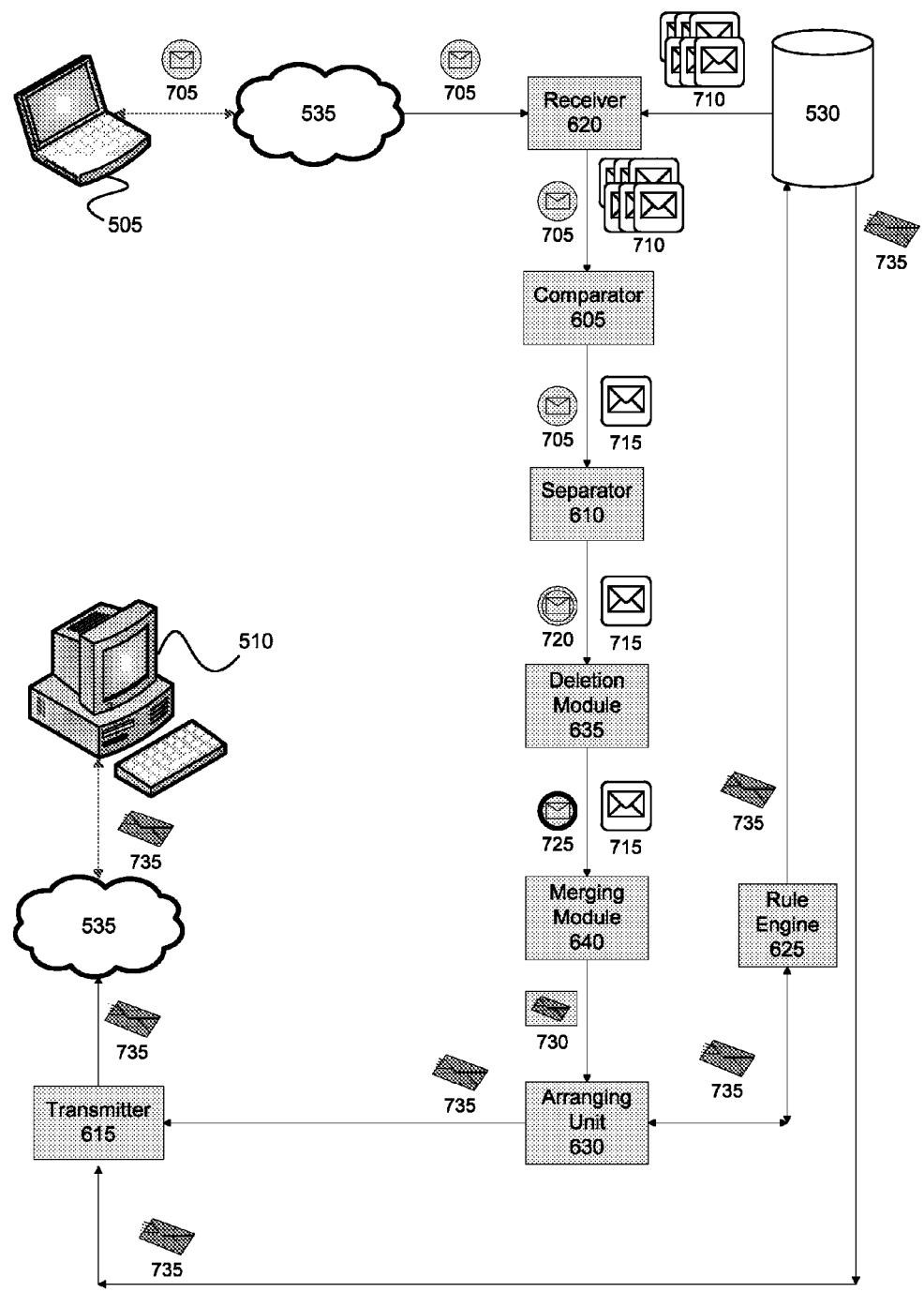
FIG. 10 illustrates a block diagram for merging electronic messages according to an embodiment of the invention.

FIG. 10 illustrates a block diagram for merging electronic messages according to an embodiment of the invention. The block diagram shows a computing device 505 sending a message 705 via a network 535 at a receiver 620 in a client (refer FIG. 7, 525). The receiver also receives stored messages 710 from a memory 530. The receiver sends the message 705 and the stored messages 710 to a comparator 605. The comparator compares the message and the stored message on a common attribute and identifies if the message relates to the stored message. If so, then the separator compares the message with the stored message and identifies content of the message which is common with content of the stored message. Based upon such identification, the separator separates the message into a static content and a dynamic content to generate an identified message 720 with an identified static content and an identified dynamic content of the message. The separator sends the identified message 720 and the stored message 715 to a deletion module 635. The deletion module deletes the static content from the message and then transmits only the dynamic content 725 of the message and the stored message to a merging module 640. The merging module merges the dynamic content of the message in the stored message to generate a merged message 730. A rule engine 625 sets a content arrangement rule, like a date based arrangement, and an alphabetical arrangement, to arrange the dynamic content in the merged message. An arranging unit 630 arranges the dynamic content in the merged message based upon the content arrangement rule. The arranging unit sends the merged message with arranged content 735 to a transmitter 615. The transmitted, then transmits the merged message with arranged content via a network 535 to a destination 510.

In another embodiment, if the message is to be transmitted later, the merged message with arranged content 735 may be sent from the arranging unit to the memory 530. The merged message with arranged content 735 is associated with a transmission rule set by the rule engine 625. Based upon the transmission rule, the merged message with arranged content is sent to the transmitter 615 for transmission to the destination 510.

In another embodiment, the merged message 730 may directly be sent to from the merging module to the memory. The merged message is associated with a transmission rule set by the rule engine 625. Based upon the transmission rule, the merged message is sent to the transmitter 615 for transmission to the destination 510.

Other embodiments of the invention may be implemented in digital electronic circuitry, or in computer hardware, firmware, software, or in combinations of them.

Elements of the invention may also be provided as a machine-readable medium for storing the machine-executable instructions. The machine-readable medium is an article of manufacture that may include, but is not limited to, Flash memory, optical disks, CD-ROMs, DVD ROMs, RAMs, EPROMs, EEPROMs, magnetic or optical cards, or other type of tangible machine-readable media suitable for storing electronic instructions in a form accessible by a machine.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The underlying principles of the invention may be employed using a virtually unlimited number of different types of input data and associated actions.

Accordingly, the scope and spirit of the invention should be judged in terms of the claims which follow.

What is claimed is:

1. A computer implemented method comprising:
   receiving a plurality of messages at a server computer via a computer network;
   determining a set of messages from the plurality of messages, each message in the set of messages relating to a message stored in a computer memory;
   the determining comprises comparing the plurality of messages and the stored message on a common attribute, in which the common attribute is a unique message identifier and a subject attribute;
   merging the set of messages with the stored message to generate a merged electronic message;
   the merging comprises:
      for each message in the set of messages, separating the message into a static content and a dynamic content, in which the static content is common with content of the stored message and the dynamic content is not common with content of the stored message, and
      adding the dynamic content of the set of messages and the stored message into the merged electronic message;
   including a status block in the merged electronic message, the status block comprising a list of not responded recipients of the stored message and a status of the stored message for each recipient in the list; and
   transmitting the merged electronic message to a destination computer via the computer network, the transmitting is initiating according to a transmission rule based on a number of messages received in reply to the stored message.

2. The method of claim 1, wherein merging comprises:
   including a menu of operations relevant to the dynamic content in the merged electronic message.

3. The method of claim 1, further comprising arranging the dynamic content in the merged electronic message by a common property.

4. The method of claim 3, wherein the common property is selected from a group comprising a sender property, a date property, and an extensible property.

5. The method of claim 1, further comprising storing the merged message in a memory.

6. The method of claim 1, further comprising:
   receiving an additional message at the server computer via the computer network;
   determining whether the additional message relates to the stored message;
   merging the additional message to the merged electronic message when the additional message relates to the stored message, wherein the merging comprises:
      separating the additional message into a static content and a dynamic content, wherein the static content is common with content of the stored message and the dynamic content is not common with content of the stored message, and
      adding the dynamic content into the merged electronic message;
   updating the status block of the merged electronic message when the additional message indicates change in a status of the stored message for a recipient; and
   transmitting the merged electronic message to the destination computer via the computer network.

7. The method of claim 1, wherein transmitting initiated according to the transmission rule comprises:
   storing the merged message in the computer memory; and
   transmitting the stored merged message from the computer memory to the destination.

8. An article of manufacture, comprising a non-transitory machine readable medium to store instructions, which when executed by a machine, causes the machine to:
   receive a plurality of messages at a server computer via a computer network;
   determine a set of messages from the plurality of messages, each message in the set of messages relating to a message stored in a computer memory;
   to determine comprises compare the plurality of messages and the stored message on a common attribute, in which the common attribute is a unique message identifier and a subject attribute;
   merge the set of messages with the stored message to generate a merged electronic message;
   to merge comprises:
      for each message in the set of messages, separate the received message into a static content and a dynamic content, in which the static content is common with content of the stored message and the dynamic content is not common with content of the stored message, and
      add the dynamic content of the set of messages and the stored message into the merged electronic message;
   include a status block in the merged electronic message, the status block comprising a list of not responded recipients of the stored message and a status of the stored message for each recipient in the list; and
   transmit the merged electronic message to a destination computer via the computer network, the transmitting is initiating according to a transmission rule based on a number of messages received in reply to the stored message.

9. The article of manufacture of claim 8, wherein the non-transitory machine readable medium stores instructions, which when executed by a machine, causes the machine further to:
   include a menu of operations relevant to the dynamic content in the merged electronic message.

10. The article of manufacture of claim 8, wherein the non-transitory machine readable medium stores instructions, which when executed by a machine, causes the machine further to arrange the dynamic content in the merged electronic message by a common property.

11. The article of manufacture of claim 8, wherein the non-transitory machine readable medium stores instructions, which when executed by a machine, causes the machine further to store the merged message in a memory.

12. The article of manufacture of claim 8, wherein the non-transitory machine readable medium stores instructions, which when executed by a machine, causes the machine further to:
   receive an additional message at the client computer via the network;
   determine whether the additional message relates to the stored message;

merge the additional message to the merged electronic message when the additional message relates the stored message, wherein the merging causes the machine to:
separate the additional message into a static content and a dynamic content, wherein the static content is common with content of the stored message and the dynamic content is not common with content of the stored message, and
add the dynamic content into the merged electronic message;
update the status block of the merged electronic message when the additional message indicates change in a status of the stored message for a recipient; and
transmit the merged electronic message to the destination computer via the computer network.

13. The article of manufacture of claim 8, wherein the non-transitory machine readable medium stores instructions, which when executed by a machine, causes the machine further to initiate the transmission of the merged message according to the transmission rule comprises:
store the merged message in a computer memory; and
transmit the stored merged message from the computer memory to the destination.

14. A system comprising:
a computer memory to store a program code and a message;
a server computer receiving a plurality of messages via a computer network;
a processor to process the program code to
determine a set of messages from the plurality of messages, each message in the set of messages relating to the stored message,
the determining comprises comparing the plurality of messages and the stored message on a common attribute, in which the common attribute is a unique message identifier and a subject attribute,
merge the set of messages with the stored message to generate a merged electronic message,
the merging comprises:
for each message in the set of messages, separating the received message into a static content and a dynamic content, in which the static content is common with content of the stored message and the dynamic content is not common with content of the stored message, and
adding the dynamic content of the set of messages and the stored message into the merged electronic message, and
include a status block in the merged electronic message, the status block comprising a list of not responded recipients of the stored message and a status of the stored message for each recipient in the list; and
a transmitter to transmit the merged electronic message to a destination computer via the computer network, the transmitting is initiating according to a transmission rule based on a number of messages received in reply to the stored message.

15. The system of claim 14, wherein the processor comprises:
a separator to separate a message from the set of messages into a static content and a dynamic content;
a deletion module to delete the static content from the message;
a merging module to merge the dynamic content and the stored message in the merged electronic message, wherein the dynamic content includes a menu of operations relevant to the dynamic content; and
an arranging unit to arrange the dynamic content in the merged electronic message by a common property.

16. The system of claim 14, further comprising a rule engine to set the transmission rule.

* * * * *